(12) United States Patent
Sakai

(10) Patent No.: US 12,014,163 B2
(45) Date of Patent: Jun. 18, 2024

(54) OTA MASTER, UPDATE CONTROL METHOD, NON-TRANSITORY STORAGE MEDIUM, AND OTA CENTER

(71) Applicant: TOYOTA JIDOSHA KABUSHIKI KAISHA, Toyota (JP)

(72) Inventor: Yoshikazu Sakai, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 17/708,338

(22) Filed: Mar. 30, 2022

(65) Prior Publication Data

US 2022/0334821 A1 Oct. 20, 2022

(30) Foreign Application Priority Data

Apr. 14, 2021 (JP) ................................ 2021-068295

(51) Int. Cl.
*G06F 8/65* (2018.01)
*G06F 8/658* (2018.01)
*G06F 8/71* (2018.01)
*H04L 12/40* (2006.01)

(52) U.S. Cl.
CPC ................. *G06F 8/65* (2013.01); *G06F 8/71* (2013.01); *H04L 12/40* (2013.01); *H04L 2012/40273* (2013.01)

(58) Field of Classification Search
CPC ... G06F 8/65; G06F 8/71; G06F 8/658; G06F 9/4881; G06F 9/5038; H04L 12/40; H04L 2012/40273; H04L 12/46
See application file for complete search history.

(56) References Cited

U.S. PATENT DOCUMENTS

| 11,669,323 B2* | 6/2023 | Harata | B60W 50/00 |
| | | | 717/169 |
| 2019/0034194 A1* | 1/2019 | Fox | G06F 21/57 |
| 2021/0026617 A1* | 1/2021 | Maru | G06F 8/65 |
| 2021/0182048 A1 | 6/2021 | Harata et al. | |
| 2022/0413833 A1* | 12/2022 | Kodama | G06F 13/00 |
| 2023/0021634 A1* | 1/2023 | He | H04L 41/20 |

FOREIGN PATENT DOCUMENTS

| JP | 2004-326689 A | 11/2004 |
| JP | 2020-027621 A | 2/2020 |

* cited by examiner

*Primary Examiner* — Daxin Wu
(74) *Attorney, Agent, or Firm* — Oliff PLC

(57) ABSTRACT

An OTA master configured to control software updates on a plurality of target ECUs mounted on a vehicle includes one or more processors. The one or more processors are configured to receive update data of software on the target ECUs and update order information from an OTA center. The update order information defines an order of the software updates on the target ECUs. The one or more processors are configured to control execution of the software updates on the target ECUs by using the update data, based on the order of the software updates.

6 Claims, 5 Drawing Sheets

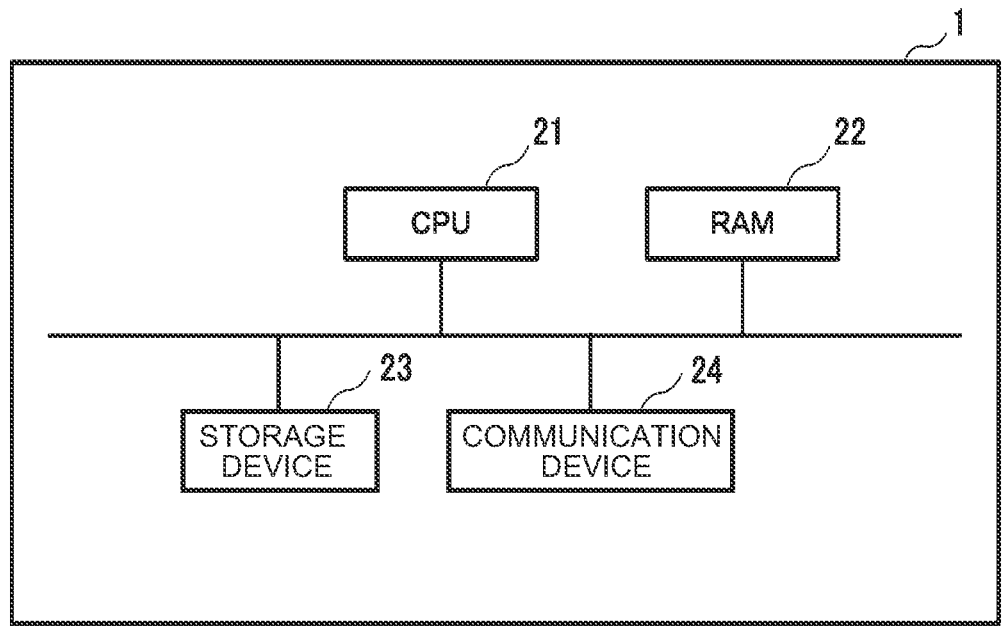
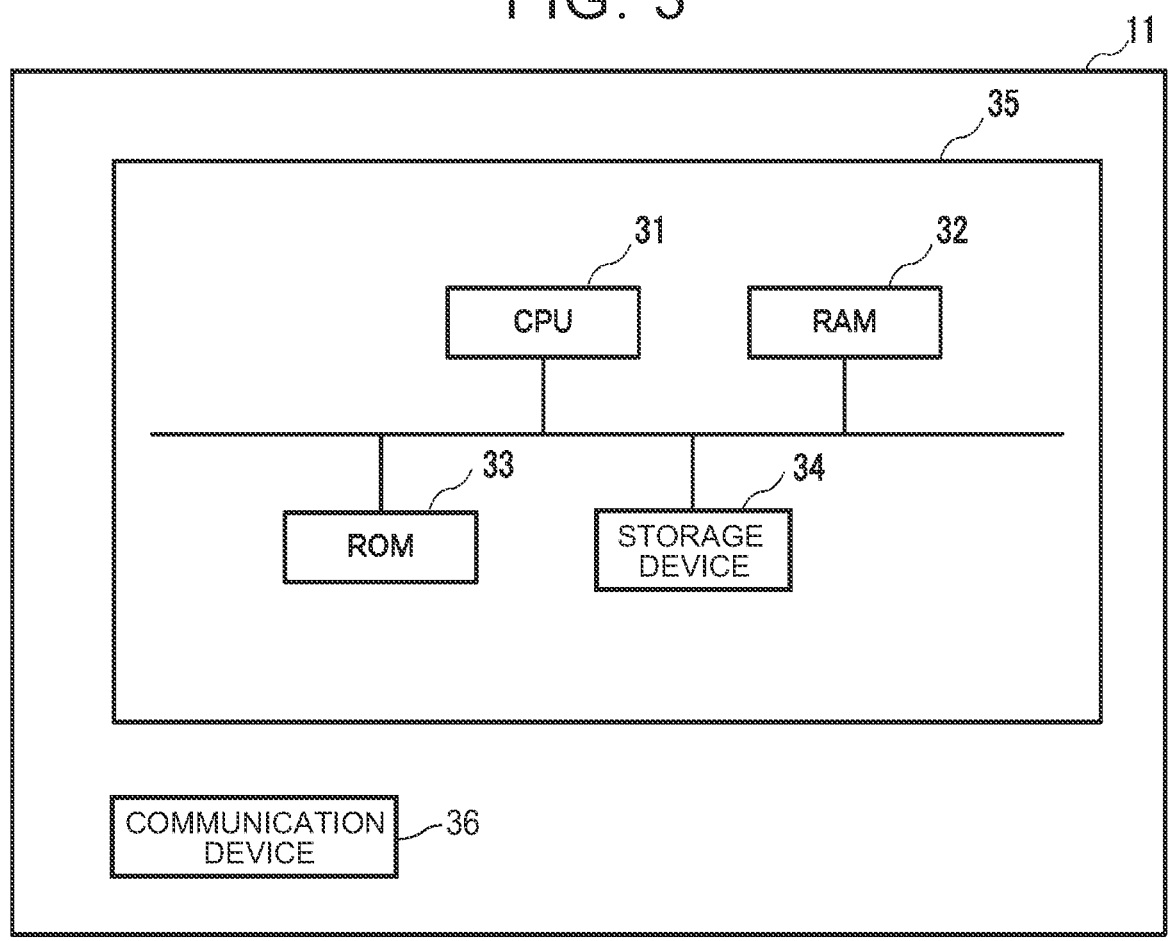

FIG. 4
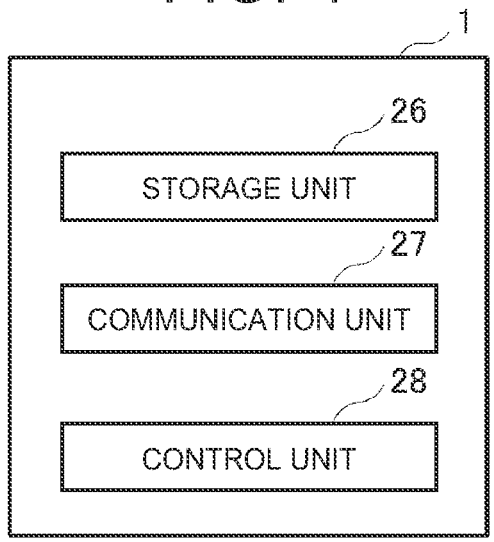
FIG. 5
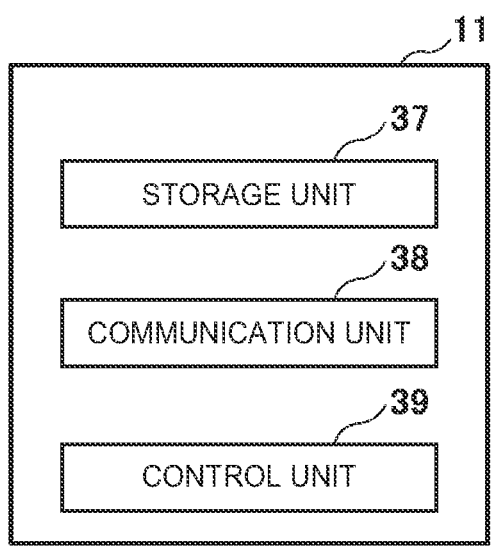
FIG. 6
|  | ECU1 | ECU2 | ECU3 | ECU4 | ECU5 | ECU6 | ECU7 |
|---|---|---|---|---|---|---|---|
| RUNNING | ○ | × | × | ○ | ○ | × | ○ |
| STOPPED | ○ | ○ | ○ | ○ | ○ | ○ | ○ |

FIG. 7

|  |  | ECU1 | ECU3 | ECU4 |
|---|---|---|---|---|
| ORDER OF SW UPDATES | UPDATE GROUP 1 (PRIORITY LEVEL 1) | A1→A2→A3 | → A4→A5 | → A6→A7 |
|  | UPDATE GROUP 2 (PRIORITY LEVEL 2) | B1→B2 |  | → B3 |

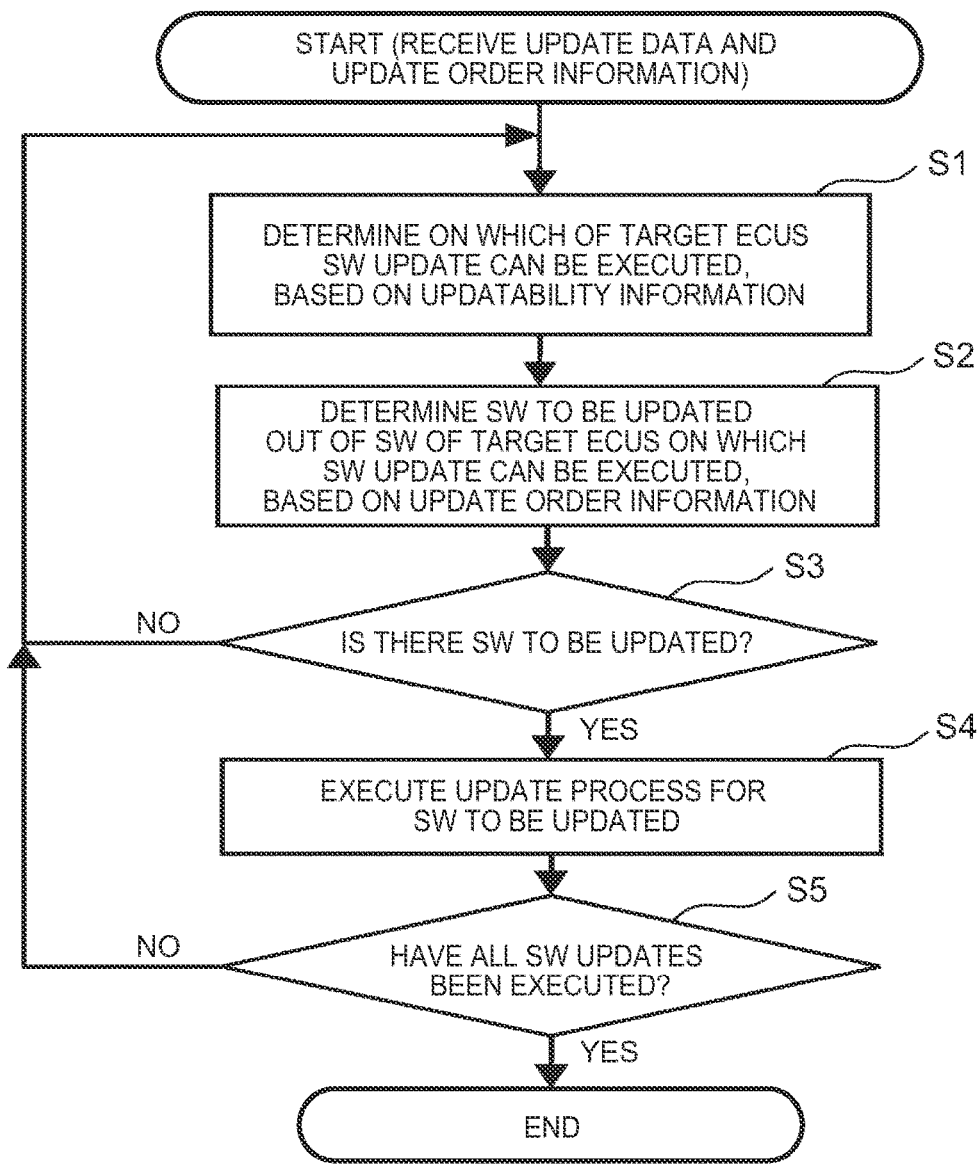

OTA MASTER, UPDATE CONTROL METHOD, NON-TRANSITORY STORAGE MEDIUM, AND OTA CENTER

CROSS-REFERENCE TO RELATED APPLICATION

This application claims priority to Japanese Patent Application No. 2021-068295 filed on Apr. 14, 2021, incorporated herein by reference in its entirety.

BACKGROUND

1. Technical Field

The present disclosure relates to OTA masters, update control methods, non-transitory storage media, and OTA centers, for controlling software updates of electronic control units (ECUs).

2. Description of Related Art

A vehicle is equipped with a plurality of electronic control units (ECUs) that controls operation of the vehicle. Each ECU includes a processor, a temporary storage unit such as a random access memory (RAM), and a nonvolatile storage unit such as a flash read only memory (ROM). Control functions of each ECU are implemented by the processor executing software stored in the nonvolatile storage unit. The software stored in each ECU is rewritable. Updating the software to a newer version can improve functions of each ECU, and can also add new vehicle control functions.

An over-the-air (OTA) technique is known as a technique of updating software on an ECU. In the OTA technique, a program on the ECU is updated or a program is added to the ECU by wirelessly connecting an in-vehicle communication device connected to an in-vehicle network to a communication network such as the Internet, downloading software from an OTA center via wireless communication, and installing the downloaded software (see, e.g., Japanese Unexamined Patent Application Publication No. 2004-326689 (JP 2004-326689 A)).

SUMMARY

When executing software updates for a plurality of ECUs by an OTA campaign (software update event for a vehicle), there may be a restriction on the order of software updates. For example, when an ECU 1 whose software has been updated sends a new signal (such as a signal newly added by a software update intended to add functions) to an ECU 2 whose software has not been updated (ECU 2 operating on old software), the ECU 2 that has received this new signal may make an error determination that it has received an unknown signal.

The present disclosure provides an OTA master, an update control method, a non-transitory storage medium, and an OTA center that can appropriately execute software updates when there is a restriction on the order of software updates for a plurality of ECUs.

An OTA master according to a first aspect of the present disclosure is configured to control software updates of a plurality of target ECUs mounted on a vehicle. The OTA master includes one or more processors. The one or more processors are configured to receive update data of software on the target ECUs and update order information from an OTA center. The update order information defines an order of the software updates on the target ECUs. The one or more processors are configured to control execution of the software updates on the target ECUs by using the update data, based on the order of the software updates.

In the OTA master according to the first aspect of the present disclosure, the one or more processors may be configured to acquire updatability information indicating whether a software update is executable on the target ECUs. The one or more processors may be configured to determine a first target ECU on which a software update is executable out of the target ECUs, based on the updatability information. The one or more processors may be configured to control execution of the software update of the first target ECU based on the order of the software updates.

In the OTA master according to the first aspect of the present disclosure, the one or more processors may be configured to control execution of a software update of a second update group prior to a first update group. The first update group and the second update group may be a group of a plurality of software updates. The first update group may include a software update related to a second target ECU determined by the one or more processors to be a target ECU on which a software update is not executable. The second update group may not include the software update related to the second target ECU.

In the OTA master according to the first aspect of the present disclosure, a priority level of the software updates of the first update group may be higher than a priority level of the software updates of the second update group.

In the OTA master according to the first aspect of the present disclosure, the one or more processors may be configured to control parallel execution of the software updates on the target ECUs.

An update control method according to a second aspect of the present disclosure is performed by a computer configured to control software updates on a plurality of target ECUs mounted on a vehicle. The computer includes one or more processors and a memory. The method includes receiving update data of software on the target ECUs and update order information from an OTA center. The update order information defines an order of the software updates on the target ECUs. The method includes controlling execution of the software updates on the target ECUs by using the update data, based on the order of the software updates.

A non-transitory storage medium according to a third aspect of the present disclosure stores instructions that are executable by a computer configured to control software updates on a plurality of target ECUs mounted on a vehicle, and that cause the computer to perform functions. The computer includes one or more processors and a memory. The functions include receiving update data of software on the target ECUs and update order information from an OTA center. The update order information defines an order of the software updates on the target ECUs. The functions include controlling execution of the software updates on the target ECUs by using the update data, based on the order of the software updates.

An OTA center according to a fourth aspect of the present disclosure is configured to communicate via a network with an OTA master configured to control software updates on a plurality of target ECUs. The OTA master is mounted on a vehicle. The OTA center includes one or more processors. The one or more processors are configured to send update data of software on the target ECUs and update order information to the OTA master. The update order information defines an order of the software updates on the target ECUs. The one or more processors are configured to cause the OTA master to execute the software updates on the target ECUs based on the order of the software updates, by sending the update data and the update order information to the OTA master.

The present disclosure provides an OTA master, an update control method, a non-transitory storage medium, and an OTA center that can appropriately execute software updates when there is a restriction on the order of software updates on a plurality of ECUs.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a block diagram showing an example of a schematic configuration f an OTA center shown in FIG. 1;

FIG. 3 is a block diagram showing an example of a schematic configuration of an OTA master shown in FIG. 1;

FIG. 4 is a functional block diagram showing an example of the OTA center shown in FIG. 1;

FIG. 5 is a functional block diagram showing an example of the OTA master shown in FIG. 1;

FIG. 6 illustrates an example of updatability information;

FIG. 7 illustrates an example of update order information;

FIG. 8 is a flowchart showing an example of a control process that is executed by the OTA master shown in FIG. 1; and FIG. 9 illustrates another example of the update order information.

DETAILED DESCRIPTION OF EMBODIMENTS

Embodiment

Figure 1:
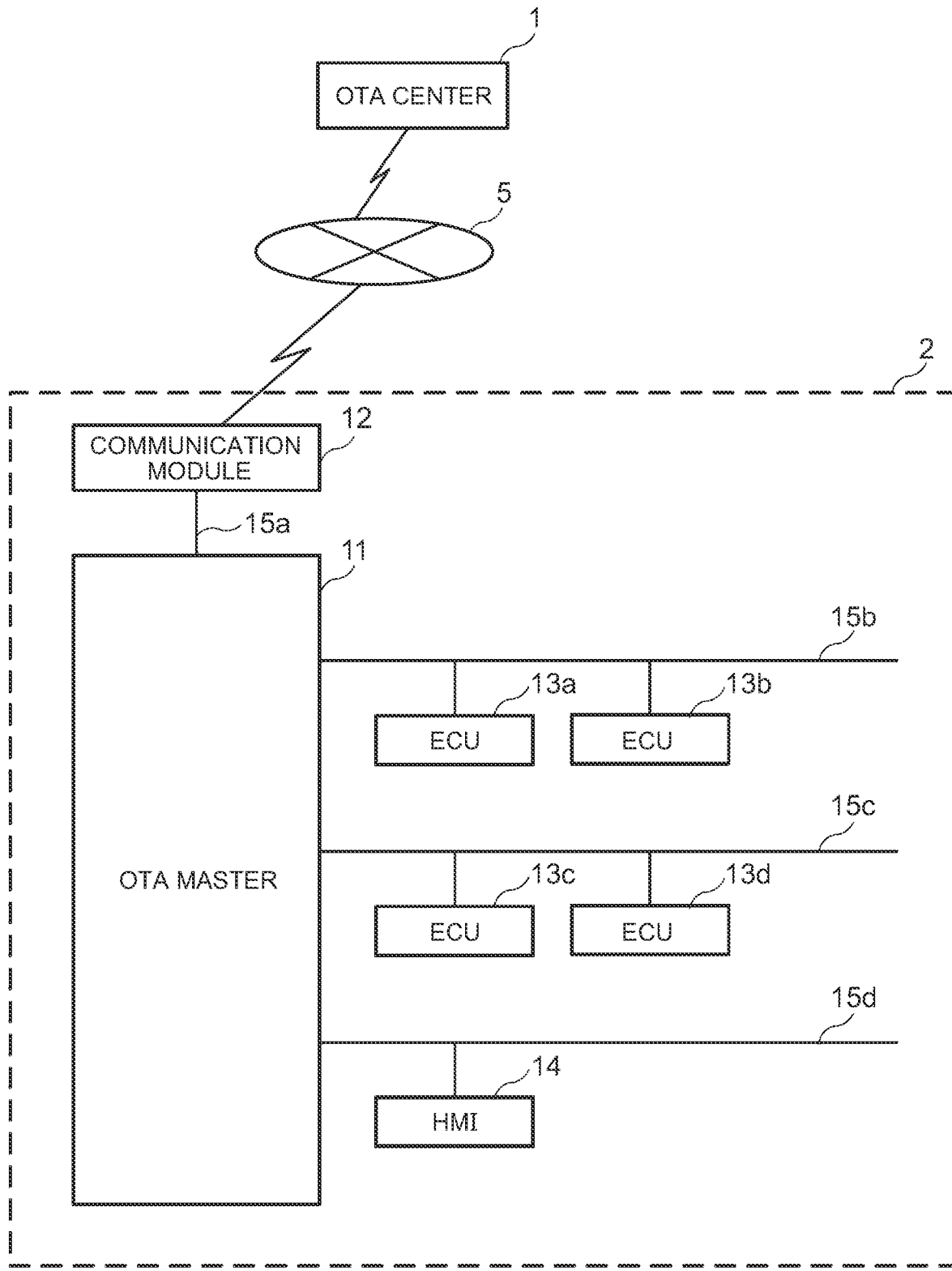
FIG. 1 is a block diagram showing an example of an overall configuration of a network system according to an embodiment.

FIG. 1 is a block diagram showing an example of an overall configuration of a network system according to an embodiment, FIG. 2 is a block diagram showing an example of a schematic configuration of an OTA center shown in FIG. 1. FIG. 3 is a block diagram showing an example of a schematic configuration of an OTA master shown in FIG. 1.

The network system shown in FIG. 1 is a system for updating software on electronic control units (ECUs) 13a to 13d mounted on a vehicle. The network system includes an OTA center 1, a communication network 5, and an in-vehicle network 2 installed in the vehicle.

The OTA center 1 can communicate with an OTA master 11 mounted on the vehicle via the communication network 5 such as the Internet. For example, this communication is wireless. The OTA center 1 manages software updates on the ECUs 13a to 13d mounted on the vehicle.

As shown in FIG. 2, the OTA center 1 includes a central processing unit (CPU) 21, a random access memory (RAM) 22, a storage device 23, and a communication device 24. The storage device 23 includes a readable and writable storage medium such as a hard disk drive (HDD) or a solid state drive (SSD), For example, the storage device 23 stores a program for performing software update management, information to be used for the software update management, and update data for the ECUs. The CPU 21 executes a control process by executing the program read from the storage device 23 by using the RAM 22 as a work area. The communication device 24 communicates with the OTA master 11 via the communication network 5.

As shown in FIG. 1, the in-vehicle network 2 includes the OTA master 11, a communication module 12, the ECUs 13a to 13d, and a human machine interface (HMI; e.g., a display device of a car navigation system on which an input operation can be performed) 14. The OTA master 11 is connected to the communication module 12 via a bus 15a, The OTA master 11 is connected to the ECUs 13a, 13b via a bus 15b. The OTA master 11 is connected to the ECUs 13c, 13d via a bus 15c. The OTA master 11 is connected to the HMI 14 via a bus 15d. The OTA master 11 can wirelessly communicate with the OTA center 1 via the communication module 12. The OTA master 11 controls software updates on the ECU whose software (sometimes referred to as "SW") is to be updated (sometimes referred to as the "target ECU") out of the ECUs 13a to 13d, based on update data acquired from the OTA center 1. The communication module 12 is a communication device that connects the in-vehicle network 2 and the OTA center 1. The ECUs 13a to 13d control the operation of various parts of the vehicle. The HMI 14 is used to display various indications, such as an indication that there is update data, an accept request screen that requests a user or an administrator to accept a software update, and an update result, during a software update process for the ECUs 13a to 13d. Although the four ECUs 13a to 13d are illustrated in FIG. 1, the number of ECUs is not limited. The one or more target ECUs may function as the OTA master 11.

As shown in FIG. 3, the OTA master 11 includes a microcomputer 35 and a communication device 36. The microcomputer 35 includes a CPU 31, a RAM 32, a read only memory (ROM) 33, and a storage device 34. The CPU 31 executes a control process by executing a program read from the ROM 33 by using the RAM 32 as a work area. The communication device 36 communicates with the communication module 12, the ECUs 13a to 13d, and the HMI 14 via the buses 15a to 15d shown in FIG. 1.

The software update process includes a download phase, an installation phase, and an activation phase. In the download phase, update data is downloaded from the OTA center 1 to the OTA master 11. In the installation phase, the OTA master 11 transfers the downloaded update data to the target ECU and installs the update data (update software) in a storage area of the target ECU. In the activation phase, the target ECU activates the installed updated version of software.

Download is a process of receiving update data for updating software on the ECU sent from the OTA center 1 and storing the received update data in the storage device 34. The download phase includes control of a series of processes related to download, such as determination as to whether download can be performed and verification of update data, in addition to reception of the update data. Installation is a process of writing an updated version of a program (the update software) in a nonvolatile memory of the target ECU based on the downloaded update data. The installation phase includes control of a series of processes related to installation, such as determination as to whether installation can be executed, transfer of update data, and verification of an updated version of a program, in addition to execution of installation. Activation is a process of activating (enabling) the installed updated version of the program. The activation phase includes a series of control related to activation, such as determination as to whether activation can be executed and verification of execution results, in addition to execution of activation.

The update data that is sent from the OTA center 1 to the OTA master 11 may include any of the following data: update software for the ECU, compressed data of the update software, and divided data of the update software or the compressed data. The update data may include an identifier that identifies the target ECU (ECU ID) and an identifier that identifies the software before update (ECU software ID). The update data is downloaded as a distribution package. The distribution package includes update data for one or more ECUs.

When the update data includes update software, the OTA master 11 transfers the update data (i.e., the update software) to the target ECU in the installation phase. When the update data includes compressed data, difference data, or divided data of the update software, the OTA master 11 may transfer the update data to the target ECU, and the target ECU may generate the update software from the update data. The OTA master 11 may generate the update software from the update data and then transfer the update software to the target ECU. The update software can be generated by decompressing the compressed data or assembling the difference data or the divided data.

The update software can be installed by the target ECU based on an installation request from the OTA master 11. Alternatively, the target ECU that has received the update data may autonomously install the update software without receiving any explicit instruction from the OTA master 11.

Activation of the update software can be performed by the target ECU based on an activation request from the OTA master 11. Alternatively, the target ECU that has received the update data may autonomously activate the update software without receiving any explicit instruction from the OTA master 11.

FIG. 4 shows an example of a functional block diagram of the OTA center 1 shown in FIG. 1. As shown in FIG. 4, the OTA center 1 includes a storage unit 26, a communication unit 27, and a control unit 28. The communication unit 27 and the control unit 28 are implemented by the CPU 21 in FIG. 2 executing a program stored in the storage device 23 by using the RAM 22. The storage unit 26 is implemented by the storage device 23 shown in FIG. 2.

FIG. 5 shows an example of a functional block diagram of the OTA master 11 shown in FIG. 1. As shown in FIG. 5, the OTA master 11 includes a storage unit 37, a communication unit 38, and a control unit 39. The communication unit 38 and the control unit 39 are implemented by the CPU 31 in FIG. 3 executing a program stored in the ROM 33 by using the RAM 32. The storage unit 37 is implemented by the storage device 34 shown in FIG. 3.

FIG. 6 is a schematic diagram illustrating an example of updatability information. The updatability information is information indicating whether a software update can be executed for each ECU mounted on the vehicle (each ECU including the target ECU) according to the state of the vehicle.

In the present embodiment, the ECUs mounted on the vehicle include ECUs on which a software update can be executed while the vehicle is stopped but cannot be executed while the vehicle is Hanning (sometimes referred to as "running-related ECUs"), and ECUs on which a software update can be executed regardless of whether the vehicle is stopped or running (sometimes referred to as "non-running-related. ECUs"). The running-related ECUs are ECUs that perform control related to running of the vehicle. Examples of the running-related. ECUs include an ECU that performs engine control, an ECU that performs brake control, and an ECU that performs steering control. The non-running-related ECUs are ECUs that perform control not related to running of the vehicle. Examples of the non-running-related ECUs include an ECU that controls a sound system and an ECU that controls an air conditioning system. As used herein, the expression "while the vehicle is stopped" refers to, for example, the state in which the vehicle speed is zero (the vehicle is not moving) in an IG-ON state (ignition power is ON). The expression "while the vehicle is running" refers to, for example, the state in which the vehicle speed is higher than zero (the vehicle is moving) in the IG-ON state.

The updatability information shown in FIG. 6 indicates that software updates can be executed on all of ECU 1 to ECU 7 mounted on the vehicle while the vehicle is stopped. The updatability information shown in FIG. 6 also indicates that software updates can be executed only on the ECU 1, the ECU 4, the ECU 5, and the ECU 7 while the vehicle is running. The ECU 1, the ECU 4, the ECU 5, and the ECU 7 are non-running-related ECUs. The ECU 2, the ECU 3, and the ECU 6 are running-related ECUs.

The OTA master 11 stores the updatability information. The OTA master 11 determines the state of the vehicle (whether the vehicle is stopped or running) by monitoring the state of the ignition power and the state of the vehicle speed. The OTA master 11 determines an ECU on which a software update can be executed, according to the determination result and the updatability information. The state of the ignition power can be monitored using, for example, a signal received from a device for monitoring the power supply state. The state of the vehicle speed can be monitored using, for example, a signal received from an ECU that controls the vehicle speed. The target ECU on which the software update can be executed is an example of the first target ECU. The target ECU on which the software update cannot be executed is an example of the second target ECU.

FIG. 7 is a schematic diagram illustrating an example of update order information. The update order information is information indicating the order of software updates on the ECUs.

In the present embodiment, it is possible to install and operate a plurality of pieces of software in one ECU, and the pieces of software are updated in a predetermined order.

Hereinafter, this will be specifically described with reference to the example of the update order information shown in FIG. 7. The update order information shown in FIG. 7 indicates that the target ECUs whose software is to be updated are the ECU 1, the ECU 3, and the ECU 4. According to an update group 1 in the update order information, software a1 (not shown) installed in the target ECU 1 is first updated to software A1, the software A1 is then updated to software A2, and subsequently the software A2 is updated to software A3. Thereafter, software a2 (not shown) installed in the target ECU 3 is updated to software A4, and then the software A4 is updated to software A5. Subsequently, software a3 (not shown) installed in the target ECU 4 is updated to software A6, and then the software A6 is updated to software A7. That is, the update group 1 defines that the update process is performed on the target ECU 1, the ECU 3, and the ECU 4 in the order of the software A1, A2, A3, A4, A5, A6, and A7, The update group 1 is an example of the first update group.

According to an update group 2, software b1 (not shown) installed in the target ECU 1 is first updated to software B1, and then the software B1 is updated to software B2. Thereafter, software b2 (not shown) installed in the target ECU 4 is updated to software B3. That is, the update group 2 defines that the update process is performed on the target ECU 1 and the ECU 4 in the order of the software B1, B2, and B3. The update group 2 is an example of the second update group.

As shown in FIG. 7, the update order information defines that the update group 1 (update group of A1, A2, A3, A4, A5, A6, and A7) has a priority level 1 and the update group 2 (update group of B1, B2, and B3) has a priority level 2. That is, the update order information defines that the update group 1 has higher update priority over the update group 2. That is, the update order information shown in FIG. 7 defines the order of software updates as "A1, A2, A3, A4, A5, A6, A7, B1, B2, and B3."

The order of software updates indicated by the update group needs to be followed in order to prevent problems such as error determination by the ECU, Specifically, the order of software updates indicated by the update group 1 (order of A1, A2, A3, A4, A5, A6, and A7) and the order of software updates indicated by the update group 2 (order of B1, B2, and B3) need to be followed. On the other hand, the order of software updates indicated by the priority level of the update group is, for example, the order according to the importance of the updates, and need not necessarily be followed. Specifically, the software updates of the update group 2 with the priority level 2 may be executed before the software updates of the update group 1 with the priority level 1.

FIG. 8 is a flowchart showing an example of the control process that is executed by the OTA master 11 according to the embodiment. Hereinafter, the control process according to the present embodiment will be described with reference to the flowchart shown in FIG. 8.

The process shown in FIG. 8 is started when the communication unit 38 of the OTA master 11 (see FIG. 5) receives software update data and update order information (see FIG. 7) sent from the OTA center 1 by an OTA campaign. The software update data and the update order information are received, for example, in the IG-ON state (the ignition power is ON) and stored in the storage unit 37.

In step S1, the control unit 39 determines ECUs on which a software update can be currently executed among the target ECUs, based on updatability information (see FIG. 6) stored in the storage unit 37, Hereinafter, this will be specifically described with reference to the updatability information shown in FIG. 6. As described with reference to FIG. 6, the control unit 39 determines the state of the vehicle (whether the vehicle is stopped or running) by monitoring the state of the ignition power and the state of the vehicle speed. The control unit 39 determines the ECU(s) on which the software update can be executed, according to the determination result of the state of the vehicle and the updatability information. For example, it is herein assumed that the target ECUs are the ECU 1, the ECU 3, and the ECU 4. In step S1, when the vehicle is running, the control unit 39 determines that the ECUs on which the software update can be executed are the target ECU 1 and the ECU 4 by referring to the updatability information shown in FIG. 6. In step S1, when the vehicle is stopped, the control unit 39 determines that the ECUs on which the software update can be executed are the target ECU 1, the ECU 3, and the ECU 4 by referring to the updatability information shown in FIG. 6. The routine then proceeds to step S2.

In step S2, the control unit 39 determines the software to be updated out of the software of the target ECUs determined as the ECUs on which the software update can be executed in step S1, based on the update order information (see FIG. 7) stored in the storage unit 37. Hereinafter, this will be specifically described with reference to the update order information shown in FIG. 7 (an example of the update order information when the target ECUs are the ECU 1, the ECU 3 and the ECU 4).

When the vehicle is stopped, the control unit 39 determines in step S1 that the ECUs on which the software update can be executed are the target ECU the ECU 3, and the ECU 4 (see FIG. 6). Therefore, in step S2, the control unit 39 determines the software to be updated out of the software of the target ECU 1, the ECU 3 and the ECU 4, based on the update order information shown in FIG. 7. For example, when step S2 is performed for the first time after the process of the flowchart of FIG. 8 is started, the control unit 39 determines that the software a1 (not shown) of the ECU 1 is to be updated to the software A1. For example, when the software of the ECU 1 has been updated to the software A2, the control unit 39 determines that the software A2 of the ECU 1 is to be updated to the software A3. For example, when the software of the ECU 1 has been updated to the software A3, the control unit 39 determines that the software a2 (not shown) of the ECU 3 is to be updated to the software A4. For example, when the software of the ECU 4 has been updated to the software A7, the control unit 39 determines that the software b1 (not shown) of the ECU 1 is to be updated to the software B1. As described above, when the vehicle is stopped, software updates can be executed on all the target ECUs. Therefore, the software to be updated is determined according to the order of software updates indicated by the update order information (that is, the order shown in FIG. 7: A1, A2, A3, A4, A5, A6, A7, B1, B2, and B3).

When the vehicle is running, the control unit 39 determines in step S1 that the ECUs on which the software update can be executed are the target ECU 1 and the ECU 4 (that is, a software update cannot be executed on the target ECU 3) (see FIG. 6). In step S2, the control unit 39 does not determine to execute software updates of the update group 1 (priority level 1) including a software update of the target ECU 3 on which the software update cannot be executed. Instead, the control unit 39 determines a software update to be executed out of software updates of the update group 2 (priority level 2). For example, when step S2 is performed for the first time after the process of the flowchart of FIG. 8 is started, the control unit 39 determines that the software b1 (not shown) of the ECU 1 is to be updated to the software B1. For example, when the software of the ECU 1 has been updated to the software B2, the control unit 39 determines that the software b2 (not shown) of the ECU 4 is to be updated to the software B3. As described above, when the vehicle is running, the control unit 39 does not determine to execute software updates of the update group 1 including a software update on the target ECU 3 on which the software update cannot be executed, but determines to execute software updates of the update group 2 that does not include a software update on the target ECU 3 on which the software update cannot be executed. That is, when the vehicle is running, the control unit 39 may, determine the software to be updated in an order different from the order of software updates indicated by the update order information (that is, the order shown in FIG. 7: A1, A2, A3, A4, A5, A6, A7, B1, B2, and B3). After step 2 described above, the routine proceeds to step S3.

In step S3, the control unit 39 determines whether the software to be updated has been determined in step S2 (that is, whether there is software to be updated). When YES in S3, the routine proceeds to step S4. When NO in step S3, the routine returns to step S1.

In step S4, the control unit 39 executes an update process for the software determined to be updated in step S2. Specifically, the control unit 39 reads update data for the software determined to be updated in step S2 from the storage unit 37. The control unit 39 sends the update data to the target ECU to install the update software in the target ECU (write the update software in the nonvolatile memory of the target ECU). The control unit 39 activates (enables) the installed software (update software). The routine then proceeds to step S5.

In step S5, the control unit 39 determines whether all the software updates related to the current OTA campaign have been executed. When YES in step S5, the process of FIG. 8 is ended. When NO in step S5, the routine returns to step S1 and the remaining software updates are executed.

As described above, in the present embodiment, execution of software updates on a plurality of target ECUs is controlled in the order of software updates based on the update order information (see FIG. 7). Therefore, a plurality of software updates (OTA campaign) with a restriction on the order of software updates can be appropriately executed.

In the present embodiment, software updates are executed based on the updatability information (see FIG. 6). Therefore, software updates can be appropriately executed based. On the order of software updates defined by the updatability information, in consideration of a restriction on whether the software on the target ECUs can be updated.

In the present embodiment, when the update group (see the update group 1 in FIG. 7) includes software updates (the updates to the software A4, A5) of the ECU (ECU 3) on which the software update cannot be currently executed, software updates of the ECU on which the software update can be executed (e.g., the ECU 1) can be executed in an order different from the order of software updates indicated by the update order information (for example, the update to the software B1 can be executed prior to the update to the software A1). As a result, according to the present embodiment, software updates can be executed in an order of software updates that need not necessarily be followed (in an update order according to the priority level). The update process can therefore be efficiently performed.

Modifications

The above embodiment illustrates a control example in which, in a situation where the update group (see update group 1 in FIG. 7) includes software updates (the updates to the software A4, A5) of the ECU on which the software update cannot be currently executed (ECU 3) because the vehicle is running, the software updates included in this update group are not executed at all (suspended). However, even when the vehicle is running, the software updates of the update group including the software updates of the ECU on which the software update cannot be currently executed may be executed to the extent possible while following the order of software updates in this update group. For example, in the case of the update order information shown in FIG. 7, control may be performed to execute the software updates of the target ECU 1 (the updates to the software A1, A2, A3) while following the order of software updates in the update group 1 in a situation where the software updates (the updates to the software A1, A5) on the target ECU 3 cannot be executed because the vehicle is running (see FIG. 6).

In the above case (even when the vehicle is running, the software updates of the update group including the software updates of the ECU on which the software update cannot be currently executed are executed to the extent possible while following the order of software updates in this update group), control may be performed to execute software updates on a plurality of target ECUs in parallel. For example, in the case of the update order information shown in FIG. 7, control may be performed to execute the update on the target ECU 4 to the software B3 in parallel with the update on the target ECU 1 to the software A1 in a situation where the software updates (the updates to the software A4, A5) on the target ECU 3 cannot be executed because the vehicle is running. Performing such a control can cause software updates to proceed efficiently.

When the priority levels of software updates on a plurality of update groups indicated by the update order information are the same, control may be performed to execute software updates of a plurality of target ECUs in parallel, Update order information shown in FIG. 9 includes an update group 3 (with the same priority level 2 as the update group 2) in addition to the update order information shown in FIG. 7, In the case of the update order information shown in FIG. 9, for example, control may be performed to execute an update on the target ECU 4 to a software C1 in parallel with the update on the target ECU 1 to the software B1 Performing such a control can cause software updates to proceed efficiently.

The example in which the ECUs mounted on the vehicle are single bank memory ECUs is described in the above embodiment. Therefore, in the above embodiment, the process of installing update software in the target ECU (single bank memory ECU) and activating the update software is described as the software update process in step S4 of FIG. 8. ECUs include single bank memory ECUs (one-bank memory ECUs) having one data storage area (bank) for storing software, and double bank memory ECUs (two-bank memory ECUs) having two data storage areas (banks) for storing software. In the single bank memory ECUs, installing update software in the data storage area and activating the update data affects the software on the ECU. On the other hand, in the double bank memory ECUs, one of the two data storage areas (including the case where two pseudo data storage areas are configured) serves as a data storage area to be read (active bank), and software stored in the data storage area to be read is executed. During execution of the software stored in the data storage area to be read (active bank), update software can be written to the other data storage area not to be read (inactive bank) in the background, During activation in the software update process, an updated version of software can be activated by switching the storage area from which the software is to be read. In the above embodiment, the ECUs mounted on the vehicle may be double bank memory ECUs. In this case, updated version of software is installed in advance in the data storage area serving as an inactive bank, and activate is performed by the data storage area serving as an inactive hank being switched to an active hank as the software update process in step S4 of FIG. 8.

The functions of the OTA center 1 illustrated in the above embodiment may be implemented as a management method that is performed by a computer including a processor (CPU), a memory, and a communication device, a management program that is executed by the computer, or a computer readable non-transitory storage medium storing the management program. Similarly, the functions of the OTA master 11 illustrated in the above embodiment may be implemented as a control method that is performed by an in-vehicle computer including a processor (CPO, a memory, and a communication device, a control program that is executed by the in-vehicle computer, or a computer readable non-transitory storage medium storing the control program. The OTA center 1 may include one or more processors. The OTA master 11 may include one or more processors.

The disclosed technique can be used in network systems for updating a program for an electronic control unit (ECU).

What is claimed is:

1. An over-the-air (OTA) master configured to control software updates on a plurality of target electronic control units (ECUs) mounted on a vehicle, the OTA master comprising one or more processors configured to:
   receive update data of software on the target ECUs and update order information from an OTA center, the update order information defining an order of the software updates on the target ECUs;
   control execution of the software updates on the target ECUs by using the update data, based on the order of the software updates;
   acquire updatability information indicating whether a software update is executable on the target ECUs;
   determine a first target ECU on which a software update is executable out of the target ECUs, based on the updatability information;
   determine a second target ECU on which a software update is not executable out of the target ECUs;
   control execution of the software update of the first target ECU based on the order of the software updates without execution of the software update of the second target ECU; and
   control execution of a software update for a second update group prior to a first update group, the first update group and the second update group being a group of a plurality of software updates, the first update group including the software update of the second target ECU, and the second update group not including the software update related to the second target ECU, a priority level of the software updates of the first update group being higher than a priority level of the software updates of the second update group.

2. The OTA master according to claim 1, wherein the one or more processors are configured to control parallel execution of the software updates on the target ECUs.

3. The OTA master according to claim 1, wherein the one or more processors are configured to determine the software to be updated out of software of the first target ECU based on the update order information.

4. The OTA master according to claim 1, wherein the updatability information indicates whether the software update is executable based on whether the vehicle is stopped or is running.

5. An update control method that is performed by a computer configured to control software updates on a plurality of target electronic control units (ECUs) mounted on a vehicle, the computer including one or more processors and a memory, the method comprising:
   receiving update data of software on the target ECUs and update order information from an over-the-air (OTA) center, the update order information defining an order of the software updates on the target ECUs;
   controlling execution of the software updates on the target ECUs by using the update data, based on the order of the software updates;
   acquiring updatability information indicating whether a software update is executable on the target ECUs;
   determining a first target ECU on which a software update is executable out of the target ECUs, based on the updatability information;
   determining a second target ECU on which a software update is not executable out of the target ECUs;
   controlling execution of the software update of the first target ECU based on the order of the software updates without execution of the software update of the second target ECU; and
   controlling execution of a software update a second update group prior to a first update group, the first update group and the second update group being a group of a plurality of software updates, the first update group including the software update of the second target ECU, and the second update group not including the software update related to the second target ECU, a priority level of the software updates of the first update group being higher than a priority level of the software updates of the second update group.

6. A non-transitory storage medium storing instructions that are executable by a computer configured to control software updates on a plurality of target electronic control units (ECUs) mounted on a vehicle, and that cause the computer to perform functions, the computer including one or more processors and a memory, the functions comprising:
   receiving update data of software on the target ECUs and update order information from an over-the-air (OTA) center, the update order information defining an order of the software updates on the target ECUs;
   controlling execution of the software updates on the target ECUs by using the update data, based on the order of the software updates;
   acquiring updatability information indicating whether a software update is executable on the target ECUs;
   determining a first target ECU on which a software update is executable out of the target ECUs, based on the updatability information;
   determining a second target ECU on which a software update is not executable out of the target ECUs; and
   controlling execution of the software update of the first target ECU based on the order of the software updates without execution of the software update of the second target ECU; and
   controlling execution of a software update a second update group prior to a first update group, the first update group and the second update group being a group of a plurality of software updates, the first update group including the software update of the second target ECU, and the second update group not including the software update related to the second target ECU, a priority level of the software updates of the first update group being higher than a priority level of the software updates of the second update group.

* * * * *